US011985076B1

(12) United States Patent
Salomon et al.

(10) Patent No.: US 11,985,076 B1
(45) Date of Patent: May 14, 2024

(54) CONFIGURING CLUSTER NODES FOR SHARING NETWORK RESOURCES

(71) Applicant: Red Hat, Inc., Raleigh, NC (US)

(72) Inventors: Yehoshua Salomon, Kfar Saba (IL); Gabriel Zvi BenHanokh, Tel-Aviv (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/081,046

(22) Filed: Dec. 14, 2022

(51) Int. Cl.
*G06F 15/16* (2006.01)
*H04L 47/70* (2022.01)
*H04L 47/724* (2022.01)
*H04L 47/74* (2022.01)

(52) U.S. Cl.
CPC .......... *H04L 47/828* (2013.01); *H04L 47/724* (2013.01); *H04L 47/745* (2013.01); *H04L 47/821* (2013.01)

(58) Field of Classification Search
CPC ............................. H04L 47/828; H04L 47/724
See application file for complete search history.

(56) References Cited

U.S. PATENT DOCUMENTS

| 6,292,905 | B1 | 9/2001 | Wallach | |
|---|---|---|---|---|
| 6,353,898 | B1 | 3/2002 | Wipfel | |
| 7,519,734 | B1 * | 4/2009 | Dumitriu | H04L 1/0018 718/105 |
| 8,949,847 | B2 | 2/2015 | Kim | |
| 9,026,658 | B2 | 5/2015 | Xu | |
| 9,075,657 | B2 * | 7/2015 | Jackson | H04L 47/827 |
| 9,420,513 | B1 | 8/2016 | Yalagandula | |
| 2007/0156919 | A1 * | 7/2007 | Potti | H04L 63/12 709/238 |
| 2016/0212063 | A1 * | 7/2016 | Calvo | H04L 41/0806 |
| 2019/0250949 | A1 * | 8/2019 | Chen | H04L 43/062 |
| 2019/0334911 | A1 * | 10/2019 | Parthasarathy | H04L 9/0891 |
| 2021/0234919 | A1 * | 7/2021 | Paralikar | H04L 67/563 |
| 2022/0407816 | A1 * | 12/2022 | G | H04L 47/805 |

FOREIGN PATENT DOCUMENTS

| CN | 112448982 A | 3/2021 |
|---|---|---|
| CN | 109240608 B | 8/2021 |

OTHER PUBLICATIONS

Urgaonkar, Bhuvan and Shenoy, Prashant, IEEE Transactions on Parallel and Distributed Systems, vol. 15, No. 1, "Sharc: Managing CPU and Network Bandwidth in Shared Clusters", https://ieeexplore.ieee.org/abstract/document/1264781, Jan. 2004, 16 pages.

* cited by examiner

*Primary Examiner* — Hieu T Hoang
(74) *Attorney, Agent, or Firm* — Dority & Manning, P.A.

(57) ABSTRACT

An example method for automated cluster configuration includes the operations of: receiving cluster configuration data identifying a plurality of nodes of a cluster; receiving a workload description characterizing plurality of respective workloads of the plurality of nodes; analyzing the workload description to identify, among the plurality of nodes, a plurality of nodes of a first type and a plurality of nodes of the second type; configuring, on at least a subset of the plurality of nodes of the second type, respective node proxies, wherein each node proxy is configured to forward, over a second network, to a chosen node of the first type, incoming requests received over a first network; and configuring an endpoint proxy to forward, over a first network, to one of: a chosen node of the first type or a chosen node of the second type, incoming requests received over an external network.

20 Claims, 6 Drawing Sheets

CONFIGURING CLUSTER NODES FOR SHARING NETWORK RESOURCES

TECHNICAL FIELD

The present disclosure is generally related to network communication in computer systems, and more particularly, to configuring cluster nodes for sharing network resources.

BACKGROUND

A cluster is a group of computing devices that may perform a particular task. Each computing device in a cluster is referred to as a node. The nodes of a cluster may be connected to each other through local area networks, with each node running its own instance of an operating system. A cluster of nodes may provide higher performance and availability than a single computer, and nodes may be added to increase processing capacity. A cluster may provide fault-tolerant high-availability. If a node fails, e.g., because of a hardware failure, the cluster may continue performing a computational task using the remaining operational nodes, for example. A cluster may communicate with computer systems external to the cluster using a wide-area network, e.g., the public Internet or other external network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
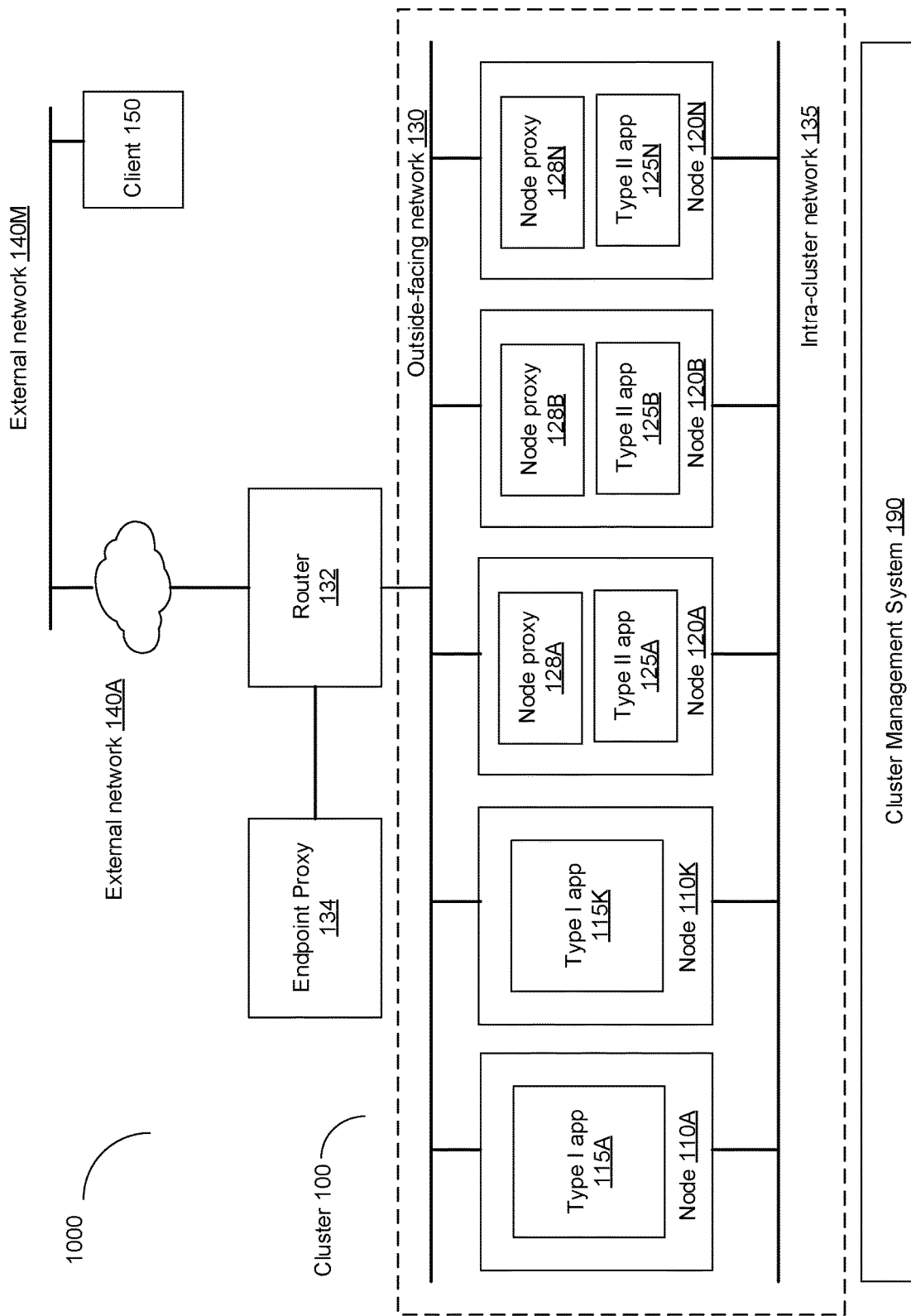
FIG. 1 depicts a high-level network topology of an example distributed computing system operating in accordance with one or more aspects of the present disclosure.

Described herein are systems and methods for configuring nodes of a cluster for sharing network resources. "Resource" herein shall refer to a physical or virtual component of limited availability within a computer system. A computer system's physical computing resources may include a processor ("CPU"), a memory, a data storage device, and input/output devices, such as a network interface device. A resource may be measured in resource units appropriate for the type of resource, such as processor cycles, bytes of memory, bytes of local storage, network bandwidth, or bandwidth to external storage on a network-accessible storage server. An "amount" of a resource herein shall refer to a number of units of the resource. "Capacity" herein shall refer to a total number of units that the resource may provide. Portions of the capacity may be "in use" and other portions of the capacity may be "available." Thus, portions of the capacity that are in use are not available until they are no longer in use.

Portions of the capacity may be allocated for a particular use or user, in which case other portions of the capacity may be unallocated and available for allocation. An allocated portion may include in-use and unused portions. Portions of the capacity that are allocated are not available for another allocation (e.g., to a different use or user) until they become unallocated (e.g., as a result of a de-allocation operation). An unallocated portion is ordinarily not in use. Virtual resources may include virtual processors, memory blocks, network connections, and disk capacity. Virtual resources may be measured in resource units as described above for physical resources. "Workload" herein shall refer to an amount of at least one resource demanded by a task. A workload may be an amount of resource demand imposed on a computer system by an application, for example. A workload may be specified as one or more resource amounts, each of which is measured in one or more respective resource units such as network bandwidth. A system having one or more resources may process a specified workload if the resource amounts demanded by the workload do not exceed the respective capacities of the system's resources.

A "network resource" may be, e.g., the available bandwidth. The bandwidth available for use by a particular host on a particular network may be limited by factors such as the total bandwidth capacity of the network, the amount of bandwidth being used by other hosts, and/or a bandwidth quota. A bandwidth quota may specify a limit on the amount of bandwidth that may be used by a particular host, user, network, or other entity involved in network communication. As an example, a cloud service provider may enforce a bandwidth quota on a particular computing device by preventing the computing device from using more bandwidth than specified by the quota.

In a cluster of computing devices, each node may be assigned resource usage quotas (e.g., network bandwidth quotas on each of one or more networks to which the node is connected). The bandwidth quota of each node may be determined and enforced by the provider of the cluster using system management and an operating system running on the cluster. If the cluster is provided by a cloud service provider, then the cloud service provider may set the bandwidth quota of each node based on factors such as the available network bandwidth, a quality-of-service level associated with the cluster, the type of network used by the nodes, and the like. The bandwidth quotas may apply to a particular network accessible by the nodes, such as the public Internet or other network for which bandwidth is relatively limited. Thus, for each node, communication with other computing devices that are outside the cluster, such as hosts on the public Internet, may be rate-limited to the node's bandwidth quota.

However, different nodes may use different amounts of bandwidth, in which case some nodes may reach their respective quotas and be unable to use further bandwidth, while other nodes may use a smaller amount of bandwidth and leave a substantial amount of their quotas unused. For example, a given node that hosts a web server accessible by clients via an external network may, at the CPU utilization level significantly below the maximum available CPU capacity, reach a bandwidth quota and thus be prevented from processing incoming requests from a certain network (e.g., from an external network, such as the Internet) at a rate above the bandwidth quota.

In some implementations, the given node may have a higher quota for communication with other nodes in the cluster via an intra-cluster network. Another node that hosts a database server and does not communicate directly with the clients may use a relatively small amount of its external bandwidth quota. Thus, the cloud service may prevent the web server node from processing requests at a rate above the web server node's quota, even though there is unused quota available at other nodes of the cluster, such as the database server nodes.

Aspects of the present disclosure address the above and other deficiencies by automatically configuring a cluster to share the network resources (e.g., the network bandwidth) between two or more of the cluster's nodes, thus enabling the cluster to process workloads which otherwise the cluster would not be able to process because the maximum network resource usage would be reached by one or more nodes. The systems and methods described herein process cluster configuration data and/or workload description of cluster nodes in order to automatically configure the cluster nodes for resource sharing. Accordingly, the systems and methods described herein may be agnostic with respect to particular applications running on the nodes, as the cluster configuration data and/or resource usage data is leveraged for configuring the node proxies and endpoint proxies, as described in more detail below.

In some implementations, a cluster may include multiple nodes interconnected via an intra-cluster network, the packets from which are not routable to network destinations outside of the cluster. At least some of the nodes may also be connected to an outside-facing network, the packets of which are routable, via one or more external networks, to network destinations outside of the cluster. The outside-facing network may be interconnected to the external network(s) via one or more routers, which may perform Open Systems Interconnection (OSI) layer 3 (network layer) routing. In some implementations, the router(s) may further perform stateless and/or stateful packet filtering, thus acting as a firewall with respect to the cluster.

The nodes may run various applications performing various functions, and thus may be classified into two or more functional types. In an illustrative example, the cluster includes a set of nodes of a first functional type (web server nodes) and another set of nodes of a second functional type (database server nodes). The web server nodes accept and serve requests from the clients via an external network (e.g., the Internet). The database nodes may be queried by the web server nodes, but do not communicate to the clients directly.

Irrespectively of their functions, all nodes may be connected to the intra-cluster network, and at least some of the nodes may be connected the outside-facing network. In an illustrative example, assuming that all nodes have the same or similar bandwidth quotas on the outside-facing network, the database nodes would consume significantly less of the outside-facing bandwidth quota as compared to the web server nodes.

In order to improve the resource efficiency of the cluster, the cluster may be configured in such a way that the otherwise unused amounts of the outside-facing bandwidth quota allocated to the database server nodes would be made available to the web server nodes, which might otherwise suffer the network bandwidth starvation.

In an illustrative example, this is accomplished by configuring an endpoint proxy that is connected, via one or more routers, to the outside-facing network and to one or more external networks. As suggested by its name, the endpoint proxy may serve as an endpoint accepting requests originated by the clients via the external network. In an illustrative example, the endpoint proxy may act as a web server accepting HTTP requests addressed to a certain Uniform Resource Identifier (URI), such as http://example-domain-name/example-file-name. The endpoint proxy may forward the incoming requests to the web server nodes; however, upon failing to identify an available web server node having sufficient resources (e.g., network bandwidth on the outside-facing network), the endpoint proxy may forward the incoming request to a database server node.

Each participating database server node may have a node proxy running, which may accept incoming requests and forward them to a specified web server node via the intra-cluster network, on which the target web server node is more likely to have sufficient bandwidth for accepting and servicing the request than on the outside-facing network.

Upon receiving the incoming request, the target web server may process the request and generate a response (e.g., a file or at least a part of a media stream), which can be forwarded to the requesting client over the same path that has been used for delivering the request or via a different path, as described in more detail herein below.

While the examples herein reference web servers and database servers, the nodes of a cluster operating in accordance with aspects of the present disclosure may perform various other functions and may utilize representational state transfer (RESTful) or other types of protocols for communicating with the clients and/or with other nodes of the cluster.

The systems and methods described herein include technical improvements to cluster configuration methods. In particular, aspects of the present disclosure may enable one node to receive a request incoming via an outside-facing network (and forward responses back to the requesting client) via another node even if the first node's bandwidth quota for the outside-facing network is insufficient for servicing the request. The applications running on the nodes need not be modified to use the dynamic resource allocation technique implemented by the system and methods of the present disclosure, since the technique is implemented by the above-described proxy daemons seamlessly for both requesting clients and applications running on the nodes.

In this way, network resources (e.g., bandwidth) that would otherwise remain unused at the second node (e.g., the database server node in the above-described example) may be effectively consumed by the first node (e.g., the web server node in the above-described example). Thus, the resources of two or more nodes may be shared efficiently to enable the cluster to process requests which, absent the described technique, the cluster would not be able to process. Since the proxy daemons may process each data packet using a relatively small number of low-latency operations, the bandwidth sharing system does not adversely affect the network throughput or latency at the participating nodes.

Various aspects of the above referenced methods and systems are described in details herein below by way of examples, rather than by way of limitation.

FIG. 1 depicts a high-level network topology of an example distributed computing system operating in accordance with one or more aspects of the present disclosure. The cluster 100 includes nodes 110A-110K running respective Type I Applications 115A-115K and further includes nodes 120A-120N running respective Type II Applications 125A-125N. Each node may be implemented by a respective physical computing devices (e.g., a physical server) or a virtual execution environment (e.g., a virtual machine).

In the illustrative examples described herein, Type I applications are also referred to as web servers, while Type II applications are also referred to as database servers; the web server nodes 110A-110K accept and serve requests from the client(s) 150 via one or more external networks 140A-140M (e.g., the Internet). The database nodes 120A-120N may be queried by the web server nodes 110A-110K, but do not communicate to the client(s) 150 directly.

In other implementations, Type I and Type II may refer to various other functionalities; one important difference between Type I applications and Type II applications is that Type I applications accept requests originated by client(s) 150, which reside outside of the cluster, while Type II applications consume significantly less network bandwidth for communicating with outside clients.

The nodes 110A-110K and 120A-120N are interconnected by the intra-cluster network 135, the packets from which are not routable to network destinations outside of the cluster. The nodes 110A-110K and at least some of the nodes 120A-120N may also be connected to the outside-facing network 130, the packets of which are routable, via one or more external networks 140A-140M, to network destinations outside of the cluster (e.g., to the client(s) 150). The outside-facing network may be interconnected to the external network(s) via one or more routers 132, which may perform Open Systems Interconnection (OSI) layer 3 (network layer) routing. In some implementations, the router(s) 132 may further perform stateless and/or stateful packet filtering, thus acting as a firewall with respect to the cluster 100.

In some implementations, all nodes 110 and 120 may have the same or similar bandwidth quotas on the outside-facing network 130; however, the nodes 120A-120N ("database server nodes") running Type II applications 125A-125N may consume significantly less of the network facing bandwidth quota on the outside-facing network 130 as compared to the nodes 110A-110K ("web server nodes") running Type I applications 115A-115K. The resource usage quotas (e.g., the network bandwidth quotas) may be enforced by the cloud provider via one or more cluster provisioning and/or monitoring components that may reside outside of the cluster 100.

In order to improve the resource efficiency of the cluster, the cluster may be configured (e.g., by the cluster management system 190) in such a way that the otherwise unused amounts of the outside-facing bandwidth quota allocated to the database server nodes 120A-120N would be made available to the web server nodes 110A-110K, which might otherwise suffer the network bandwidth starvation.

In an illustrative example, this is accomplished by an endpoint proxy 134 acting in concert with node proxies 128A-128N. The endpoint proxy 134 that may be connected, via one or more routers 132, to the outside-facing network 130 and to one or more external networks 140. In some implementations, the endpoint proxy 134 may reside in a demilitarized zone (DMZ) of the router 132 that interconnects the outside-facing network 130 to one or more external networks 140. As suggested by its name, the endpoint proxy 134 may serve as an endpoint accepting requests originated by the client(s) 150. In an illustrative example, the endpoint proxy 134 may act as a web server accepting HTTP requests addressed to an advertised Uniform Resource Identifier (URI), such as http://example-domain-name/example-file-name. The endpoint proxy 134 may forward the incoming requests to the web server nodes 110A-110K and/or to the database server nodes 120A-120N.

For each incoming request, the endpoint proxy 134 may select, among the web server nodes 110A-110K, a web server node (e.g., the web server node 110K) that has sufficient resources (e.g., network bandwidth on the outside-facing network 130) for processing the request.

In an illustrative example, the determination of the sufficient bandwidth may be made based on the size of the transmit queue (e.g., the number of transmitted requests that have not been acknowledged) for each node or network interface. Accordingly, the endpoint node may determine that a given node has sufficient network bandwidth if the size of the transmit queue of the node does not exceed a predefined threshold value, which can be calibrated based on the available statistical data.

In another illustrative example, the determination of the sufficient bandwidth may be made based on the average latency of response in the most recent predefined period of time. Accordingly, the endpoint node may determine that a given node has sufficient network bandwidth if the response latency of the node does not exceed a predefined threshold value, which can be calibrated based on the available statistical data.

In some implementations, in addition to ascertaining that the chosen web server node has available network bandwidth, the endpoint proxy 134 may ascertain availability of other resources at the chosen web server node, e.g., based on the CPU load, I/O load, and/or other performance characteristics.

Upon successfully identifying a web server node 110 (e.g., the web server node 110K) having sufficient network bandwidth (and, in some implementations, satisfying other selection criteria) for processing the incoming request, the endpoint proxy 134 may forward the request to the identified web server node.

Conversely, should the endpoint proxy 134 fail to identify a web server node 110 having sufficient network bandwidth for processing the incoming request, the endpoint proxy 134 may select, among the database server nodes 120A-120N, a database server node (e.g., the database server node 120N) that has sufficient resources (e.g., network bandwidth on the outside-facing network 130) for accepting the request (and, in some implementations, for forwarding the response).

Alternatively, the endpoint proxy 134 may implement a round robin scheme for selecting a web server node 110 or a database server node 120 to process the incoming request. Thus, a list of nodes 110 and nodes 120 would be iterated through in an indefinite cycle, by selecting, at each incoming request, the next node from the list and wrapping around to the first node on the list after selecting the last node on the list.

Furthermore, in some implementations, the endpoint proxy 134 may implement sticky forwarding, such that a subsequent request from the client 150 that has recently issued a previous request would be forwarded to the same web server node 110K that was chosen for processing the previous request.

Each database server node 120A-120N may have a node proxy 128A-120N running, which may accept incoming requests and forward them to a web server node 110K via the intra-cluster network 135. In various implementations, the node proxies 128 may employ a variety of techniques for selecting the web server node to service the request. In an illustrative example, a node proxy may select a web server node that has sufficient resources for servicing the request, e.g., based on the CPU load, I/O load, and/or other performance characteristics. In another illustrative example, a node proxy may implement a round robin scheme for selecting the web server node.

Upon receiving the incoming request, the recipient web server node (e.g., web server node 110K) may process the request and generate a response (e.g., a file or at least a part of a media stream). In some implementations, the web server node 110L may forward the response to the requesting client 150 over the same path that has been used for delivering the request (e.g., via the database server node 120 and the endpoint proxy 134). Alternatively, the web server node 110K may forward the response, via a database server node 120, to a router 132 interconnecting the outside-facing network 135 to one or more external networks 140A-140M, such that the router 132 would forward the response to the requesting client 150.

The cluster management system 190 may deploy and configure the components of the cluster 100, including the nodes 110A-110K and 120A-120N, the node proxies 128A-128N, and the endpoint proxy 134. The cluster management system 190 may use the cluster configuration data and/or workload description in order to automatically configure the cluster nodes for resource sharing.

The network topology illustrated by FIG. 1 is an illustrative example only. Various other network topologies may be implemented by distributed computer systems operating in accordance with the present disclosure. Also, various auxiliary components, such as routers, switches, firewalls, network segments, etc., may be omitted from FIG. 1 for clarity and conciseness.

Figure 2:
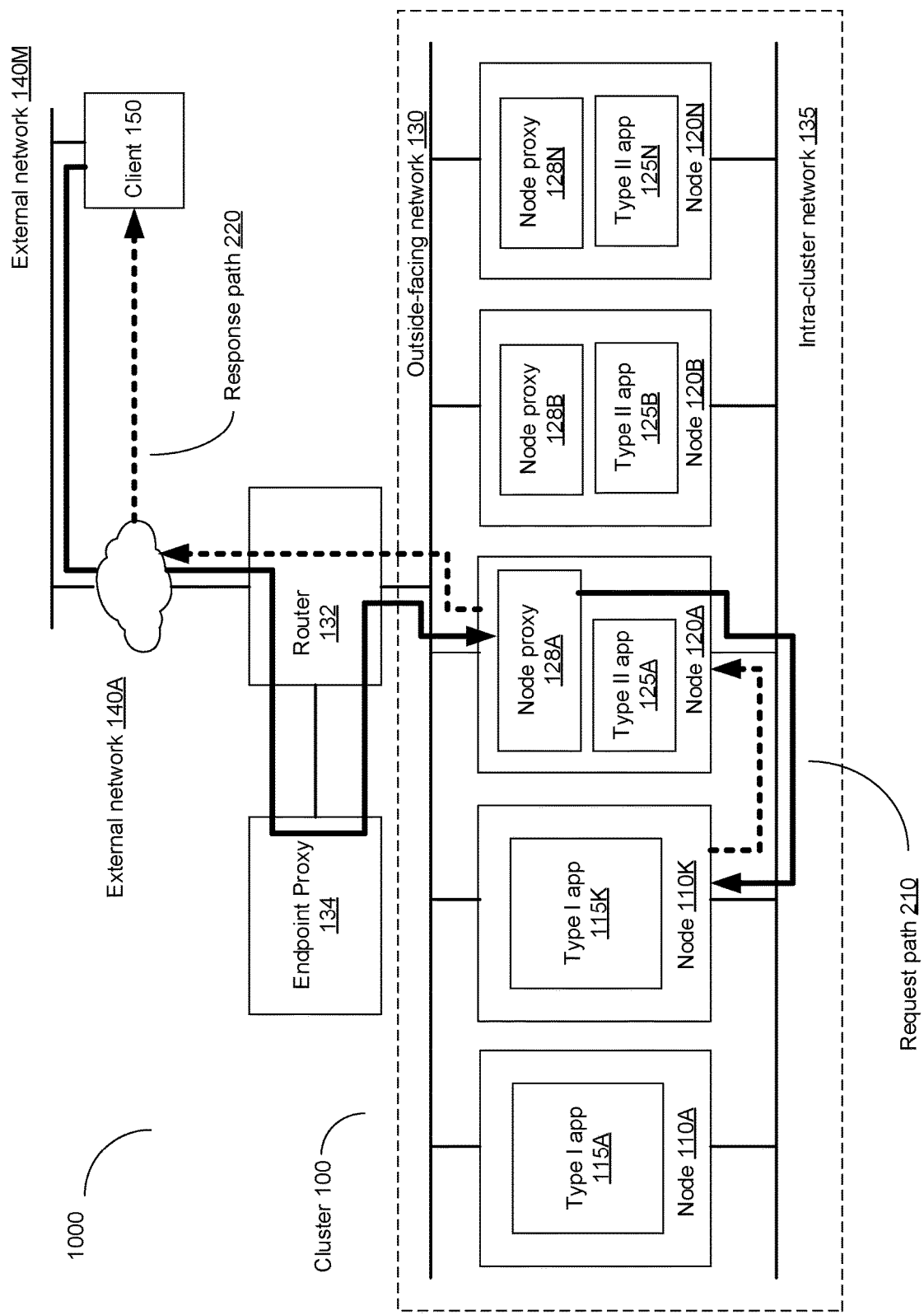
FIG. 2 schematically illustrates the request path and the response path 220 implemented by an example distributed computing system operating in accordance with one or more aspects of the present disclosure.

FIG. 2 schematically illustrates the request path 210 (solid bold line) and the response path 220 (dashed bold line) implemented by the example distributed computing system 1000 of FIG. 1. In an illustrative example, a request originated by the client 150 is directed to the endpoint proxy 134, which may act as a web server accepting HTTP requests addressed to a certain URI, such as http://example-domain-name/exampsle-file-name. Accordingly, the request may traverse one or more external networks 140A-140M until it reaches the router 132, which forwards it to the endpoint proxy 134.

As noted herein above, the endpoint proxy 134 may forward the incoming requests to a web server node 110 (this scenario is not shown in FIG. 2). Conversely, upon failing to identify an available web server node having sufficient resources (e.g., network bandwidth on the outside-facing network), the endpoint proxy 134 may forward the incoming request to a database server node (e.g., node 120A) via the outside-facing network 130.

The node proxy 128A running on the database server node 120A may accept the incoming request and forward it to a web server node 110K via the intra-cluster network 135. Upon receiving the incoming request, the recipient web server node (e.g., web server node 110K) may process the request and generate a response (e.g., a file or at least a part of a media stream). In the illustrative example of FIG. 2, the web server node 110L may forward the response to the requesting client 150 via the database server node 120A and the router 132, such that the router 132 would forward the response to the requesting client 150.

The network topology illustrated by FIG. 2 is an illustrative example only. Various other network topologies may be implemented by distributed computer systems operating in accordance with the present disclosure. Also, various auxiliary components, such as routers, switches, firewalls, network segments, etc., may be omitted from FIG. 1 for clarity and conciseness.

Figure 3:
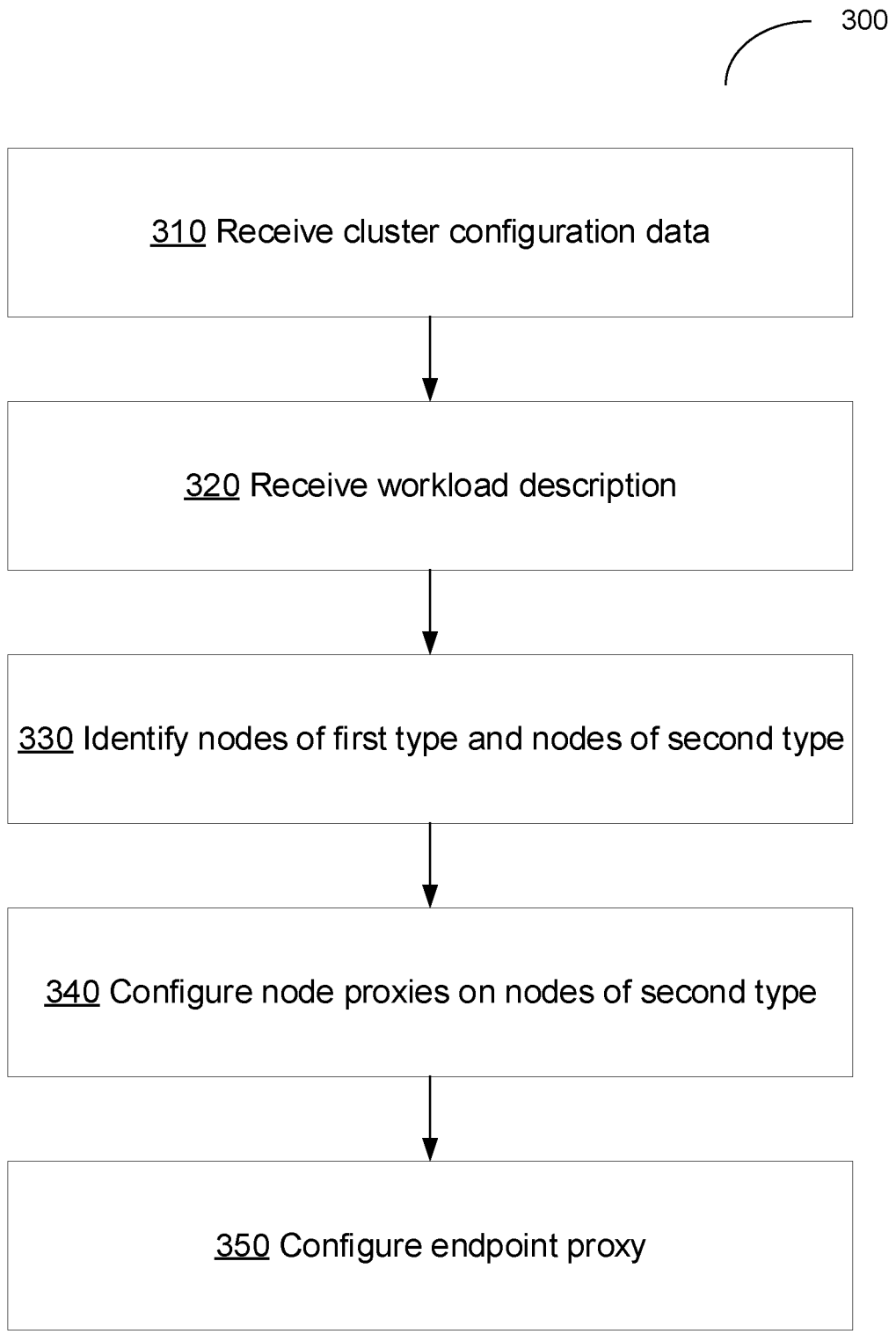
FIG. 3 depicts a flow diagram of an example method for configuring the endpoint proxy and node level proxies, in accordance with one or more aspects of the present disclosure.

FIG. 3 depicts a flow diagram of an example method 300 for configuring the endpoint proxy and node level proxies, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other. In an illustrative example, method 300 may be performed by a computing device (e.g., computer system 600 of FIG. 6) implementing the cluster management system 190.

At block 310, the processing device implementing the method receives the cluster configuration data. In an illustrative example, the cluster configuration data may identify the cluster nodes. For each node, the cluster configuration data may specify the addresses of the network interfaces connecting the node to the outside-facing network 130 and the intra-cluster network 135. The cluster configuration data may further specify the addresses of the network interfaces of the router 132 on the external network 140A and the outside-facing network 130, as well as the address of the endpoint proxy 134.

At block 320, the processing device receives the workload description of the respective workloads of the cluster nodes. In some implementations, the workload description may include the computing resource usage data by the nodes of the cluster (e.g., the network bandwidth usage by each network interface for one or more specified time periods, CPU usage by each node for one or more specified time periods, and/or other computing resource usage by each node for one or more specified time periods). In some implementations, the processing device may collect the resource usage data in near real time, e.g., by communicating to the cluster management system and/or resource usage monitoring agents deployed on one or more cluster nodes.

At block 330, the processing device analyzes the workload description in order to identify the nodes of the first type (e.g., nodes 110A-110K) that do not reach peak CPU usage while consuming the maximum available network bandwidth on the outside-facing network; those nodes are classified as running Type I applications. In an illustrative example, a node that operates below a predefined peak CPU usage while consuming at least a predefined share (e.g., 90%) of the maximum available network bandwidth on the first network is identified as a node of the first type.

The processing device further analyzes the cluster configuration data in order to identify the nodes of the second type (e.g., nodes 120A-120N) that at all times consume significantly less than the maximum available network bandwidth on the outside-facing network; those nodes are classified as running Type II applications. In an illustrative example, a node that consumes no more than a predefined share (e.g., 10%) of the maximum available network bandwidth on the first network is identified as a node of the second type.

In other implementations, various other criteria for Type I and Type II application running nodes may be utilized. In some implementations, the processing device may employ one or more trainable neural networks, such that each neural network may receive the resource usage data of a given node and yield the probability of the given node running Type I or Type II applications.

At block 340, the processing device deploys and configures (e.g., by creating and modifying one or more configuration files that specify the values of various parameters of the node proxies 128A-128N), on one or more nodes of the second type 120A-120N (e.g., one or more nodes that has been classified as a node running Type II application), a corresponding node proxy 128A-120N for accepting incoming requests and forwarding them to nodes of the first type 110A-110K (e.g., each node that has been classified as a node running Type I application) via the intra-cluster network 135, as described in more detail herein above.

At block 350, the processing device configures the endpoint proxy 134 (e.g., by creating and/or modifying one or more configuration files that specify the values of various parameters of the endpoint proxy 134) to forward the incoming client-originated requests to the nodes 110A-110K and/or to the nodes 120A-120N. For each incoming request, the endpoint proxy 134 would select, among the nodes of the first type 110A-110K, a node (e.g., node 110K) that has sufficient resources (e.g., network bandwidth on the outside-facing network 130) for processing the request. Upon successfully identifying a node 110 (e.g., node 110K) having sufficient network bandwidth (and, in some implementations, satisfying other selection criteria) for processing the incoming request, the endpoint proxy 134 would forward the request to the identified node. Conversely, should the endpoint proxy 134 fail to identify a node of the first type 110A-110K having sufficient network bandwidth for processing the incoming request, the endpoint proxy 134 would select, among the nodes of the second type 120A-120N, a server node (e.g., node 120N) that has sufficient resources (e.g., network bandwidth on the outside-facing network 130) for accepting the request (and, in some implementations, for forwarding the response), as described in more detail herein above.

Figure 4:
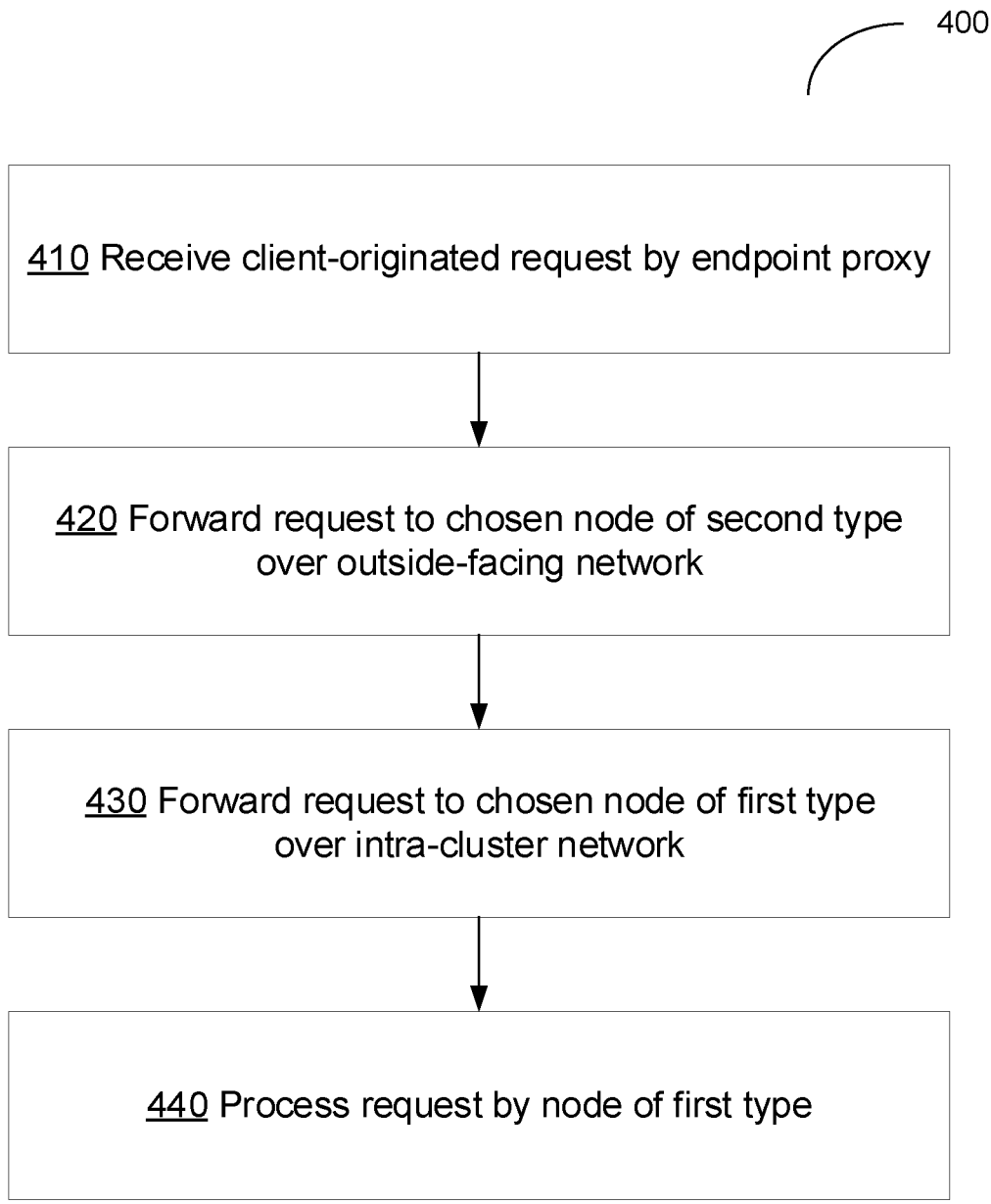
FIG. 4 depicts a flow diagram of an example method for processing the client-originated requests by a cluster operating in accordance with one or more aspects of the present disclosure.

FIG. 4 depicts a flow diagram of an example method 400 for processing the client-originated requests by a cluster operating in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other. In an illustrative example, method 300 may be performed by a computing device (e.g., computer system 600 of FIG. 6) implementing the cluster management system 190.

At block 410, the endpoint proxy, which is connected (directly or via one or more routers) to an external network and an outside-facing network, receives a request originated by a client that is connected to the external network, as described in more detail herein above.

At block 420, the endpoint proxy forwards the request, over the outside-facing network, to a chosen node of a second type of the cluster of nodes. In an illustrative example, the node may be chosen based on a predefined node selection criterion (e.g., reflecting availability of a certain resource, such as network bandwidth or CPU load), as described in more detail herein above.

At block 430, the node proxy operating on the chosen node of the second type forwards the request, over the intra-cluster network, to a chosen node of a first type for processing. In an illustrative example, the node may be chosen based on a predefined node selection criterion (e.g., reflecting availability of a certain resource, such as network bandwidth or CPU load), as described in more detail herein above.

At block 440, the chosen node of a first type processes the request. In an illustrative example, processing the request involves generating a response to the request (e.g., generating a response file or at least a part of a response media stream) and forwarding the response file or stream to the client.

Figure 5:
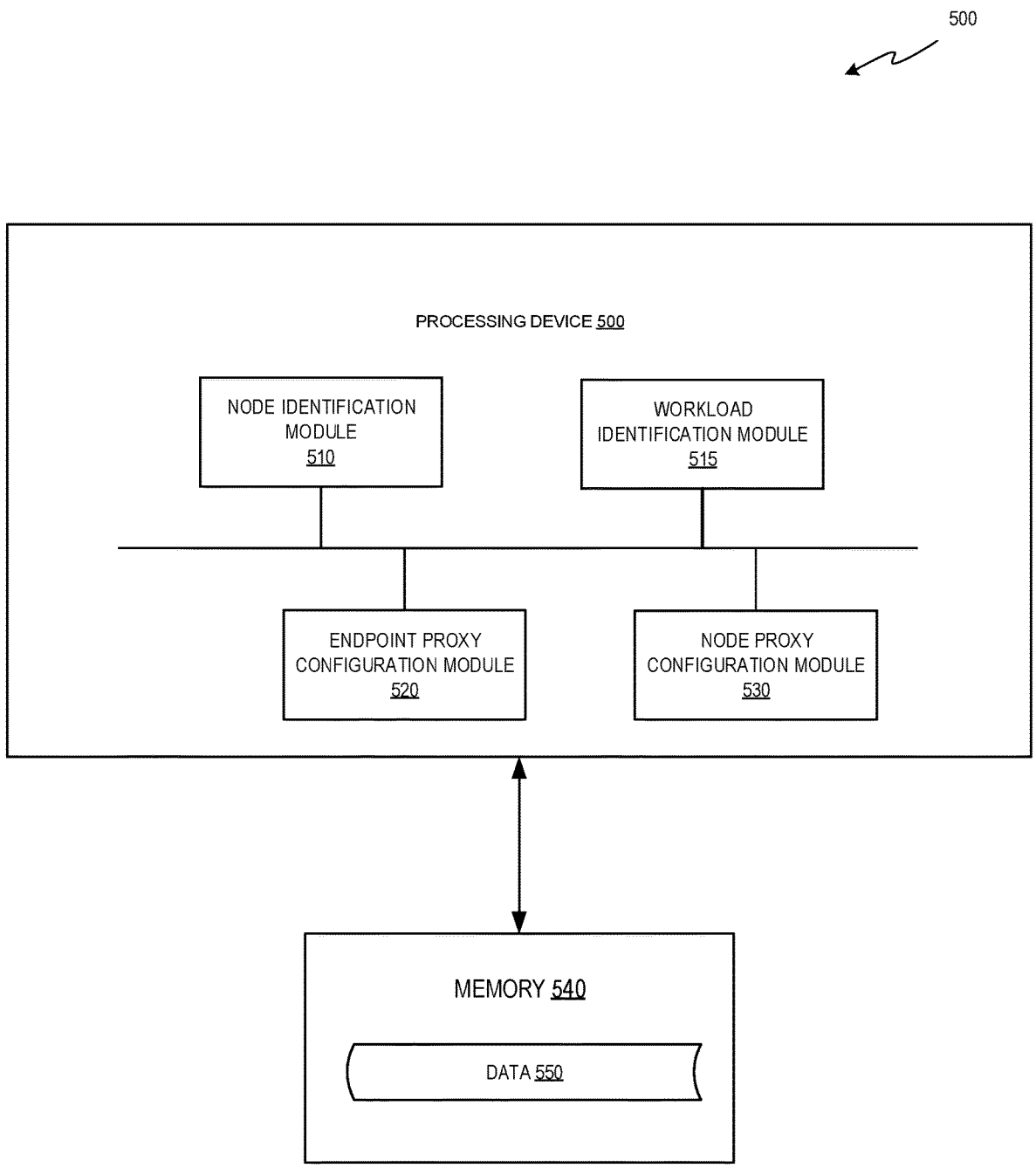
FIG. 5 depicts a block diagram of a computer system operating in accordance with one or more aspects of the present disclosure.

FIG. 5 depicts a block diagram of a computer system 500 operating in accordance with one or more aspects of the present disclosure. Computer system 500 may implement the cluster management system 190 of FIG. 1, and may include one or more processors and one or more memory devices. In the example shown, computer system 500 may include a processing device 500 and a memory 540. The processing device 500 may implement a node identification module 510, an endpoint proxy configuration module 520, and a node proxy configuration module 530. The memory 540 may be utilized the executable instructions implementing the above-described and other modules, as well as data 550 consumed by the above-described and other modules. Each module may be implemented by one or more software threads or processes.

The node identification module 510 may identify the nodes of the cluster, which may include the nodes 110A-110K and 120A-120N, as described in more detail herein above.

The workload identification module 515 may identify the requirements from the workloads on each node and may further identify the resources that are not used by some of the nodes, thus classifying the nodes identified by the node identification module 510 into nodes 110A-110K running respective Type I applications 115A-115K and the nodes 120A-120N running respective Type II applications 125A-125N, as described in more detail herein above.

The endpoint proxy configuration module 520 may configure the endpoint proxy 134 to forward the incoming client-originated requests to the web server nodes 110A-110K and/or to the database server nodes 120A-120N, as described in more detail herein above.

The node proxy configuration module 530 may configure, on each node 120A-120N, a corresponding node proxy 128A-120N for accepting incoming requests and forwarding them to a web server node 110K via the intra-cluster network 135, as described in more detail herein above.

Figure 6:
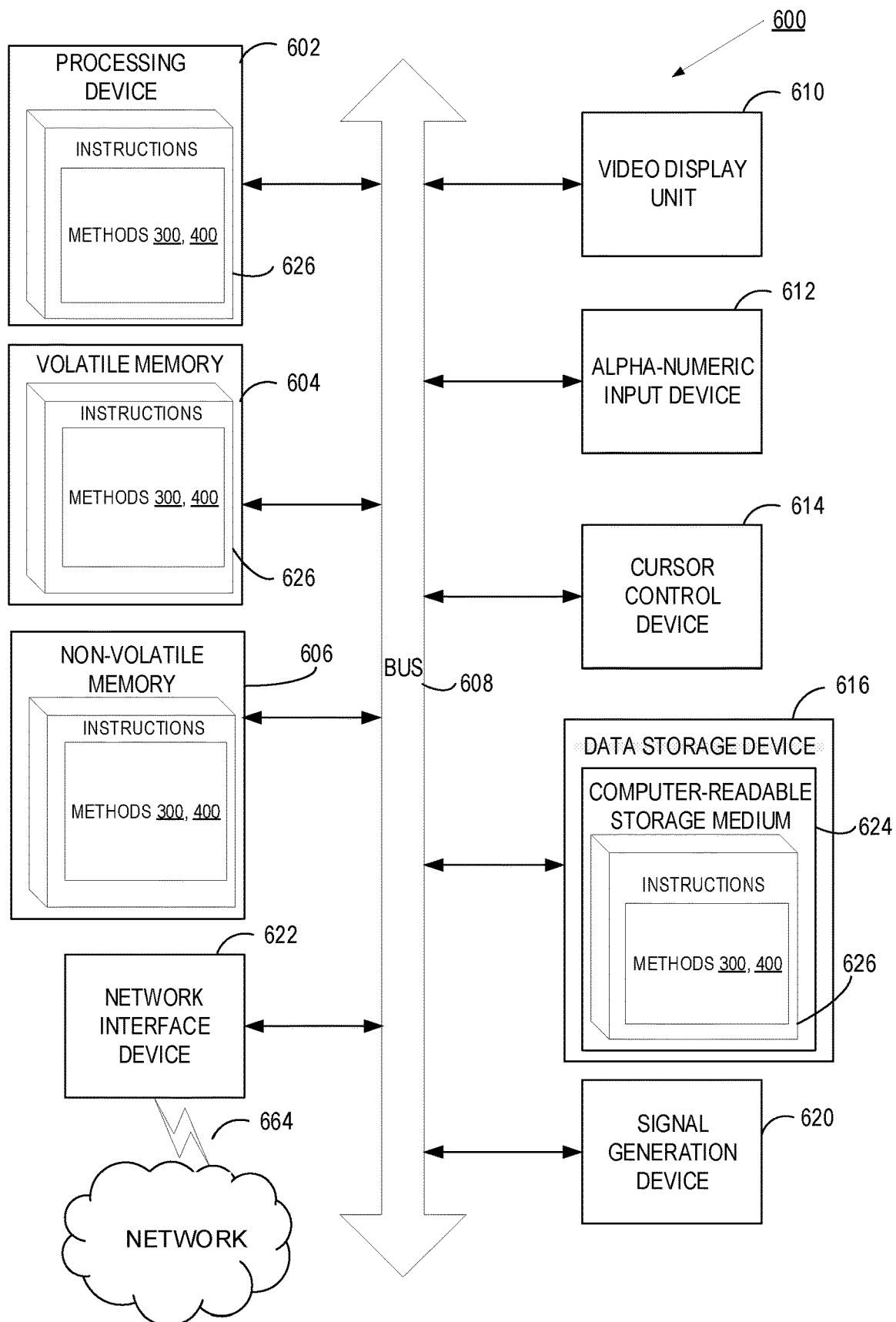
FIG. 6 depicts a block diagram of a computer system operating in accordance with one or more aspects of the present disclosure.

FIG. 6 depicts a block diagram of a computer system operating in accordance with one or more aspects of the present disclosure. In various illustrative examples, computer system 600 may implement one or more computing devices depicted in FIG. 1. In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 300 for configuring the endpoint proxy and node level proxies and/or 400 for processing the client-originated requests by a cluster operating in accordance with one or more aspects of the present disclosure.

Instructions 626 may also reside, completely or partially, within volatile memory 604, non-volatile memory 606, and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, cluster configuration data identifying a plurality of nodes of a cluster;
   receiving a workload description characterizing plurality of respective workloads of the plurality of nodes;
   analyzing the workload description to identify, among the plurality of nodes, a plurality of nodes of a first type and a plurality of nodes of a second type;
   configuring, on at least a subset of the plurality of nodes of the second type, respective node proxies, wherein each node proxy is configured to forward, over a second network, to a chosen node of the first type, incoming requests received over a first network; and
   configuring an endpoint proxy to forward, over the first network, to one of: a chosen node of the first type or a chosen node of the second type, incoming requests received over an external network.

2. The method of claim 1, wherein the endpoint proxy is connected to the first network and to the external network.

3. The method of claim 1, wherein the first network is an outside-facing network of the cluster of nodes, such that a network packet from the first network is routable to an external network.

4. The method of claim 1, wherein the second network is an intra-cluster network of the cluster of nodes, such that no packets from the second network are routable to an external network.

5. The method of claim 1, wherein each node of the first type operates below predefined peak CPU usage while consuming at least a predefined share of a maximum available network bandwidth on the first network.

6. The method of claim 1, wherein each node of the second type consumes no more than a predefined share of a maximum available network bandwidth on the first network.

7. The method of claim 1, wherein the endpoint proxy is configured to choose a node for forwarding an incoming request based on availability of a specified network resource on the node.

8. A system comprising:
a memory; and
a processing device operatively coupled to the memory, the processing device to:
  receive cluster configuration data identifying a plurality of nodes of a cluster;
  receive a workload description characterizing plurality of respective workloads of the plurality of nodes;
  analyze the workload description to identify, among the plurality of nodes, a plurality of nodes of a first type and a plurality of nodes of a second type;
  configure, on at least a subset of the plurality of nodes of the second type, respective node proxies, wherein each node proxy is configured to forward, over a second network, to a chosen node of the first type, incoming requests received over a first network; and
  configure an endpoint proxy to forward, over the first network, to one of: a chosen node of the first type or a chosen node of the second type, incoming requests received over an external network.

9. The system of claim 8, wherein the endpoint proxy is connected to the first network and to the external network.

10. The system of claim 8, wherein the first network is an outside-facing network of the cluster of nodes, such that a network packet from the first network is routable to an external network.

11. The system of claim 8, wherein the second network is an intra-cluster network of the cluster of nodes, such that no packets from the second network are routable to an external network.

12. The system of claim 8, wherein each node of the first type operates below predefined peak CPU usage while consuming at least a predefined share of a maximum available network bandwidth on the first network.

13. The system of claim 8, wherein each node of the second type consumes no more than a predefined share of a maximum available network bandwidth on the first network.

14. The system of claim 8, wherein the endpoint proxy is configured to choose a node for forwarding an incoming request based on availability of a specified network resource on the node.

15. A non-transitory computer-readable storage medium storing executable instructions that, when executed by a processing device, cause the processing device to:
  receive, by a cluster management system, cluster configuration data identifying a plurality of nodes of a cluster;
  receive a workload description characterizing plurality of respective workloads of the plurality of nodes;
  analyze the workload description to identify, among the plurality of nodes, a plurality of nodes of a first type and a plurality of nodes of the second type;
  configure, on at least a subset of the plurality of nodes of the second type, respective node proxies, wherein each node proxy is configured to forward, over a second network, to a chosen node of the first type, incoming requests received over a first network; and
  configure an endpoint proxy to forward, over the first network, to one of: a chosen node of the first type or a chosen node of the second type, incoming requests received over an external network.

16. The non-transitory computer-readable storage medium of claim 15, wherein the endpoint proxy is connected to the first network and to the external network.

17. The non-transitory computer-readable storage medium of claim 15, wherein the first network is an outside-facing network of the cluster of nodes, such that a network packet from the first network is routable to an external network; and
  wherein the second network is an intra-cluster network of the cluster of nodes, such that no packets from the second network are routable to an external network.

18. The non-transitory computer-readable storage medium of claim 15, wherein each node of the first type operates below predefined peak CPU usage while consuming at least a predefined share of a maximum available network bandwidth on the first network.

19. The non-transitory computer-readable storage medium of claim 15, wherein each node of the second type consumes no more than a predefined share of a maximum available network bandwidth on the first network.

20. The non-transitory computer-readable storage medium of claim 15, wherein the endpoint proxy is configured to choose a node for forwarding an incoming request based on availability of a specified network resource on the node.

* * * * *